Dec. 31, 1968     R. WICK ET AL     3,418,906
PHOTOFLASH UNIT
Filed Aug. 30, 1966                                        Sheet 4 of 4
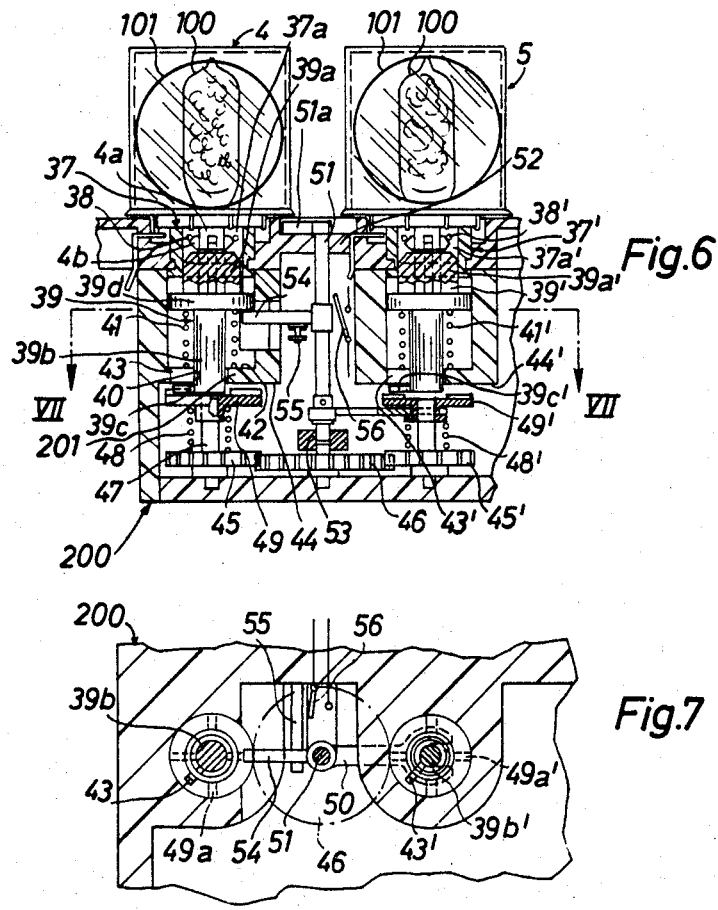
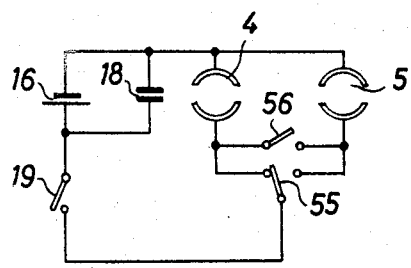
INVENTOR.
RICHARD WICK
HANS-PETER HUBER
FRIDOLIN HENNIG United States Patent Office 3,418,906
Patented Dec. 31, 1968

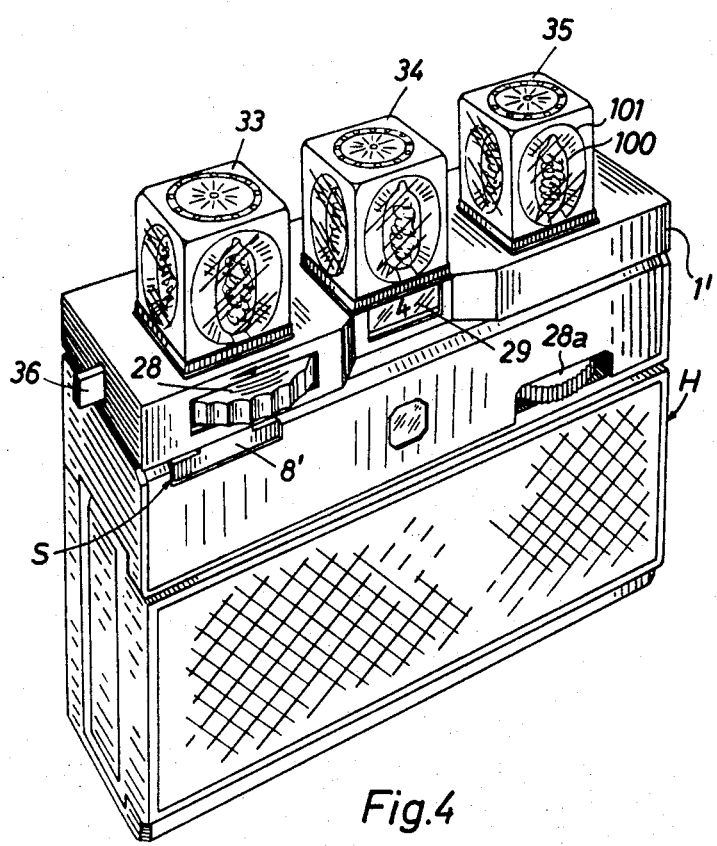

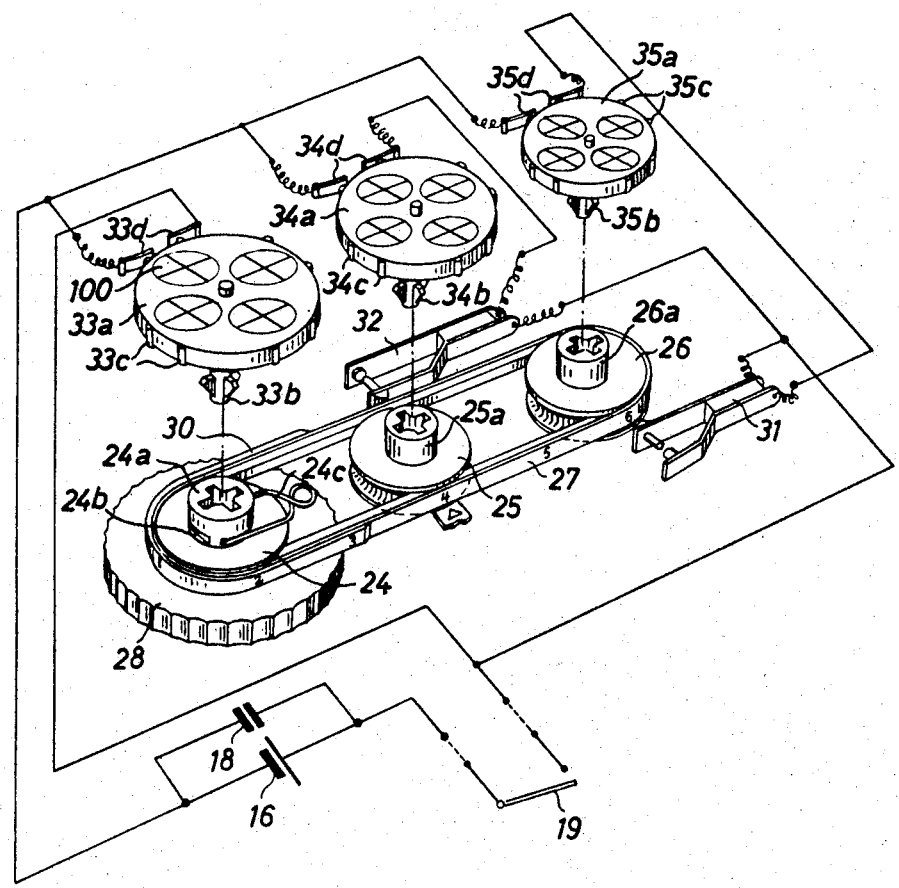

3,418,906
PHOTOFLASH UNIT
Richard Wick, Grunwald, near Munich, Hans-Peter Huber and Fridolin Hennig, Munich, Germany, assignors to Agfa-Gevaert Aktiengesellschaft, Leverkusen, Germany
Filed Aug. 30, 1966, Ser. No. 576,007
Claims priority, application Germany, Sept. 2, 1965, A 50,170
23 Claims. (Cl. 95—11)

The present invention relates to photoflash or flash units for use in or on photographic cameras. More particularly, the invention relates to improvements in flash units of the type which may utilize one or more expendable multiple flash bulb holders, for example, holders sold under the name "Flashcube."

Presently known flash units which utilize expendable multiple flash bulb holders are not provided with any devices which would indicate the number of fresh flash bulbs in the holder. Thus, the user of the camera must count the number of exposures which were made with flash to make sure that a spent holder is replaced with a new one prior to making the next exposure with flash. Alternatively, the user must look at the holder in order to determine the number of fired flash bulbs. This second procedure is very unreliable and often impossible, especially if the room in which the exposure with flash is to be made is dark so that the discoloration of spent flash bulbs cannot be determined by visual observation.

Accordingly, it is an important object of our present invention to provide a novel flash unit which enables the user of the camera to immediately determine the number of spent or fresh flash bulbs and which can support two or more multiple flash bulb holders so that the user can make a large number of successive exposures with flash without necessitating replacement of a spent holder.

Another object of the invention is to provide a flash unit of the just outlined characteristics which can automatically eject a spent multiple flash bulb holder subsequent to firing of the last flash bulb.

A further object of the invention is to provide a flash unit for use with two or more multiple flash bulb holders wherein all of the holders can be ejected in a simultaneous operation.

A concomitant object of the invention is to provide a flash unit which can be provided with a separate housing or casing or which can be built directly into the housing of a still camera or movie camera.

An additional object of the invention is to provide a flash unit which can be coupled with the film transporting mechanism of a camera in such a way that one or more multiple flash bulb holders are automatically indexed to new positions in response to manipulation of the film transporting mechanism upon completion of an exposure with flash.

A further object of the invention is to provide a flash unit which can be converted from firing of one to firing of more flash bulbs at a time, or vice versa.

Another object of the invention is to provide a flash unit which can be readily attached to or detached from a conventional photographic camera and wherein a spent multiple flash bulb holder can be replaced independently of the other holder or holders.

An ancillary object of the invention is to provide the flash unit with a novel indexing mechanism for one, two or more multiple flash bulb holders.

Another object of the invention is to provide a flash unit which can support two or more multiple flash bulb holders and wherein a fresh holder is automatically connected in the flash circuit in response to firing of all flash bulbs in the preceding holder.

Briefly stated, one feature of our invention resides in the provision of a flash unit which may be used with particular advantage in connection with multiple flash bulb holders of the type provided with a plurality of angularly spaced equidistant flash bulbs. The flash unit comprises a housing or casing which may be a separate part or is constituted by a portion of the camera housing. This casing supports two or more indexible coupling members, for example, rotary sockets of the type capable of accommodating the foot of a "Flashcube" so that, when properly connected thereto, the holder will rotate with the respective coupling member. The flash unit further comprises indexing means operative to rotate at least one of the coupling members at a time through increments corresponding to the angles between successive flash bulbs on the holders carried by such coupling members, a flash circuit (which may be accommodated in the casing of the flash unit or certain parts of which may be accommodated in the camera proper) for firing successive flash bulbs of one holder during intervals between successive indexing movements of the respective coupling member, switch contact means provided in the flash circuit and movable from a first to a second position to thereby connect the other holder into the flash circuit, and motion transmitting means for moving the switch contact means to second position in automatic response to that operation of the indexing means which follows the firing of the last unexpended bulb in a holder, i.e., in response to each fifth operation of the indexing means if a fresh holder contains four flash bulbs. This insures that the operator can make additional exposures with flash subsequent to firing of all flash bulbs in a first holder.

The flash unit may comprise switch means which may be closed by hand to thereby connect more than one multiple flash bulb holder in the flash circuit so that two or more flash bulbs can be fired simultaneously.

The novel features which are considered as characteristic of the invention are set forth in particular in the appended claims. The improved flash unit itself, however, both as to its construction and its mode of operation, together with additional features and advantages thereof, will be best understood upon perusal of the following detailed description of certain specific embodiments with reference to the accompanying drawings, in which:

FIG. 4 is a perspective view of a second flash unit with three multiple flash bulb holders, the unit being attached to the housing of a photographic camera;

FIG. 5 is a perspective view of the indexing mechanism and electric circuit in the flash unit of FIG. 4;

FIG. 6 is a fragmentary central vertical section through a third flash unit with two multiple flash bulb holders which is built into the housing of a camera and comprises an automatic ejector for each of the holders;

FIG. 7 is a horizontal section as seen in the direction of arrows from the line VII—VII of FIG. 6; and FIG. 8 illustrates the electric circuit of the third flash unit.

Figure 1:
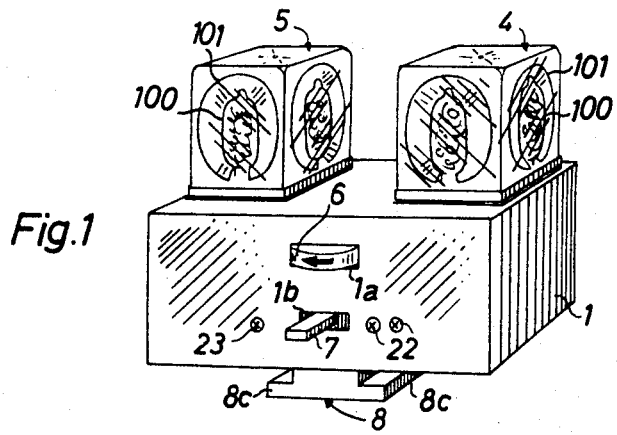
FIG. 1 is a perspective view of a flash unit with two multiple flash bulb holders which embodies one form of our invention.
Figure 2:
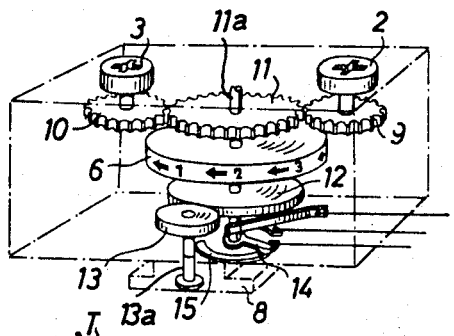
FIG. 2 is a perspective view of the indexing mechanism for the multiple flash bulb holders, the casing of the flash unit being indicated by phantom lines.

Referring first to FIGS. 1 and 2, there is shown a flash unit which comprises a substantially block-shaped casing or housing 1 having at its underside a standard foot 8 which may be introduced into the shoe of a photographic camera. The foot 8 is provided with terminals 8a, 8b (see FIG. 3) which come into current-conducting contact with terminals 8A, 8B provided in the camera when the foot is properly attached to the shoe. The top panel of the casing 1 is provided with two openings for a pair of indexible coupling members here shown as disk-shaped sockets 2, 3 each adapted to receive and to retain the plug of a standard multiple flash bulb holder. In FIG. 1, the two flash bulb holders 4, 5 (which are respectively connected to the sockets 2, 3) are shown in the form of so-called "Flashcubes" which are readily available on the market and each of which comprises four angularly spaced equidistant flash bulbs 100 each located in front of a reflector 101. These holders will be described in greater detail in connection with FIGS. 5 and 6.

That side panel of the casing 1 which faces the user of the camera to which the flash unit of FIG. 1 is attached is provided with a cutout or window 1a accommodating a portion of a manually operable symbol carrier here shown as being constituted by a wheel 6. The peripheral surface of this symbol carrier or wheel is provided with indicia in the form of arrows and numerals best shown in FIG. 2. A second cutout or window 1b which is located below the window 1a accommodates a portion of a manually operable selector lever 7 which can open and close an electric switch 21 shown in FIG. 3.

The casing 1 may be omitted altogether if the structure shown in FIG. 2 is built directly into the housing of a photographic camera. Also, the terminals 8a, 8b may be provided at the end of a customary synchronization cable. Alternatively, one of the terminals 8a, 8b may be located centrally at the underside of the foot 8 to engage a complementary terminal in the central region of the shoe. The other terminal is then preferably provided on one of the two horizontal rails 8c on the foot 8 and engages a complementary terminal in the shoe.

FIG. 2 shows that the sockets 2, 3 are provided with substantially cruciform slots which can receive the plugs of the holders 4, 5. These sockets are respectively connected with driven gears 9, 10 which mesh with a driver gear 11 affixed to a motion transmitting shaft 11a. The radius of the driver gear 11 equals the diameter of the driven gear 9 or 10 and the number of teeth on the gear 11 equals the sum of teeth on the gears 9 and 10 so that each of the sockets 2, 3 completes two full revolutions in response to a single revolution of the wheel 6. The motion transmitting shaft 11a further carries the wheel 6 and a friction wheel 12 meshing with a friction wheel 13 mounted on a shaft 13a which can be driven by the film transporting mechanism when the casing 1 is properly attached to the camera. The arrangement is such that each manipulation of the film transporting mechanism to advance the film by the length of a frame will result in turning of the sockets 2, 3 and holders 4, 5 through exactly 90 degrees.

The motion transmitting shaft 11a is connected with a substantially radially extending switch contact 14 which can engage one of two arcuate sections 15a, 15b of a fixed contact 15.

Figure 3:
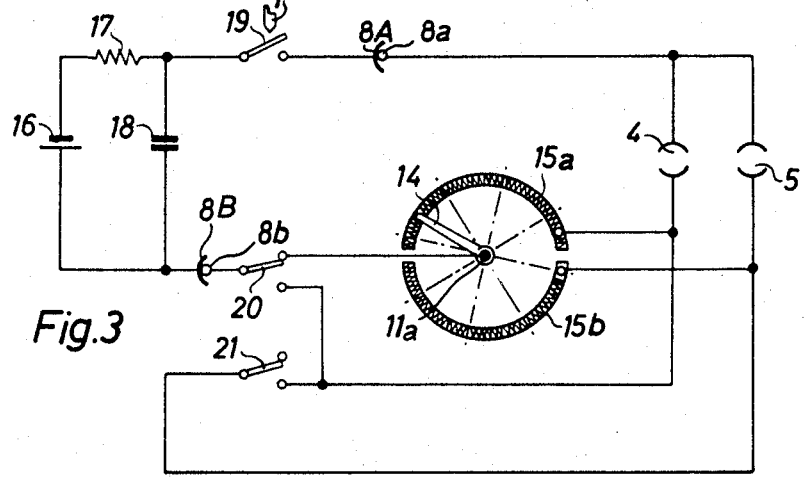
FIG. 3 illustrates the electric circuit of the flash unit.

Referring now to FIG. 3, there is shown a complete flash circuit which, in addition to the switch composed of the contacts 14, 15, includes a synchronization switch 19 arranged to close in response to depression of a release trigger T in the camera, a source of electrical energy in the form of a battery 16, a customary resistor 17, a capacitor 18, and a two-way switch 20. The latter can be actuated by the lever 7 simultaneously with the switch 21.

The purpose of the lever 7 and switches 20, 21 is to allow for simultaneous firing of two flash bulbs 100, for example, when the subject is located at a considerable distance from the camera or when the flash unit is to illuminate a relatively large area. The indicators 22, 23 shown in FIG. 1 indicate to the user whether the unit is set for firing of a single flash bulb (indicator 23) or of two flash bulbs at a time (indicator 22).

FIG. 3 shows that, when the switch 21 is open and the movable contact of the switch 20 assumes the illustrated position, only one of the holders 4, 5 is connected in the flash circuit because the switch contact 14 can engage only one of the fixed contact sections 15a, 15b at a time. These sections form a circle around the shaft 11a.

A very important advantage of the switch including the contacts 14, 15 is that it automatically connects in the flash circuit that holder which contains unfired flash bulbs as soon as the other flash bulb holder is expended. In FIG. 3, the contact 14 is shown in an angular position in which the first flash bulb 100 of a freshly inserted holder 4 is ready for firing. The contact 14 will continue to engage the section 15a in response to three successive manipulations of the film transporting mechanism (friction drive 12, 13, 13a) so that the operator can fire the other three flash bulbs in the holder 4. In response to the next-following manipulation of the film transporting mechanism, the motion transmitting shaft 11a moves the contact 14 into engagement with the section 15b so that the first flash bulb of the holder 5 is ready to be fired.

The peripheral surface of the symbol carrier wheel 6 carries a first set of four arrows which point in a clockwise direction and a second set of four arrows which point in a counterclockwise direction. In addition, this surface carries two sets of numerals 1, 2, 3, 4, each located behind one of the arrows. The dimensions of the window 1a are such that the operator of the camera will see one arrow and the associated numeral at a time. In FIG. 1, the arrow which is visible on the wheel 6 points toward the holder 5 and the numeral (not shown) behind this arrow indicates the number of spent flash bulbs in the holder which is pointed at by the arrow. If the user wishes to utilizes a holder with one, two or three spent flash bulbs, the wheel 6 will be rotated by hand until the fresh flash bulb is properly oriented so that it faces the subject during the next exposure with flash. The friction wheel 12 then simply rotates with reference to the friction wheel 13 because such change in the angular position of the partially spent holder must be carried out without any manipulation of the film transporting mechanism.

The driver gear 11 completes a full revolution when the user has completed eight exposures with flash. This driver gear 11 can rotate the driven gears 9, 10 through one or more sets of intermediate gears, not shown. Also, the contact 14 can be affixed directly to the gear 11 or wheel 6 as long as it moves in response to indexing of the holders 4, 5.

FIG. 4 illustrates the housing H of a photographic camera which is coupled with the housing or casing 1' of a modified flash unit adapted to support three multiple flash bulb holders 33, 34, 35. The foot 8' of the casing 1' is received in a standard shoe S of the housing H.

FIG. 5 merely shows the bases 33a, 34a, 35a of the holders 33–35 and the plugs 33b, 34b, 35b which can be inserted into cruciform recesses of coupling members or sockets 24a, 25a, 26a accommodated in the casing 1'. Each of the three bases 33a–35a has four pairs of contacts 33c, 34c, 35c which may respectively engage pairs of fixed contacts 33d, 34d, 35d provided in the casing 1'. Thus, when a pair of contacts 33c engages the contacts 33d, the corresponding flash bulb 100 is connected in the flash circuit and can be fired in response to closing of the synchronization switch 19.

The sockets 24a–26a are respectively connected to or integral with rotary members in the form of gears 24, 25, 26 which mesh with an endless flexible element here shown as an internally toothed belt 27. The indexing mechanism for the holders 33–35 further comprises a knurled or milled hand wheel 28 which extends through a cutout or window provided in the rear side panel of the casing 1'. Alternatively, the holders 33–35 can be rotated by a wheel 28a (see FIG. 4) which forms part of the film transporting mechanism and transmits motion to the gear 26 through a suitable friction clutch (not shown).

The socket 24a has four equidistant facets 24b two of which are engaged by the legs of a detent spring 24c which enables the operator to sense when the wheel 28 has been indexed through exactly 90 degrees.

The outer side of the toothed belt 27 is provided with equidistant numerals one to twelve one of which is located behind the window 29 (FIG. 4) when the wheel 28 is idle. These numerals indicate to the user the total number of spent or fresh flash bulbs in all of the holders. The distance between successive numerals equals the distance which the belt 27 covers in response to a manipulation of the wheel 28 in order to rotate the holders 33–35 through 90 degrees.

The outer side of the belt 27 is further provided with an elongated motion transmitting rib or trip 30 which can close one of two normally open switches 31, 32 at a time. The positioning of the trip 30 is such that the switches 31, 32 remain open when the first holder 33 (base 33a) contains at least one unexpended flash bulb 100. The trip 30 will close the switch 32 by displacing the movable contact of this switch when the operator makes the fifth, sixth, seventh and eighth exposures with flash, and the switch 31 will be closed for making the last four exposures with flash. The length of the trip 30 equals the distance covered by the belt 27 in response to four successive rotations of the wheel 28. In other words, this trip 30 insures that all of the flash bulbs in the holder 34 or 35 are fired before the switch 32 or 31 opens. The aforementioned pairs of fixed contacts 33d–35d are connected in parallel. The fixed contact of the switch 32 is connected in series with one of the contacts 34d, and the fixed contact of the switch 31 is connected in series with one of the contacts 35d.

The operation of the flash unit which is shown in FIGS. 4 and 5 is as follows:

The foot 8' is inserted into the shoe S and the operator then connects the holders 33–35 with the respective sockets 24a–26a. It is assumed that each holder contains four unexpended flash bulbs 100. During the first four exposures with flash, the trip 30 travels toward the switch 32 but the latter remains open. The switch 31 is also open so that the holders 34 and 35 are not connected into the flash circuit. When the flash bulbs of the holder 33 are expended and the operator again turns the wheels 28, the trip 30 closes the switch 32 by displacing the movable contact of this switch which then remains closed during and subsequent to three additional manipulations of the wheel 28. The switch 31 is closed when the switch 32 is allowed to open and each exposure which is made while the trip 30 closes the switch 31 results in firing of one of the flash bulbs in the holder 35.

The casing 1' further supports an ejector 36 (see FIG. 4) which is depressed when the last flash bulb of the holder 35 has been fired. This ejector then expels the plugs 33b–35b from the sockets 24a–26a. Since the casing 1' is rather long (because it supports a row of three holders 33–35), the release trigger (not shown) is preferably provided at the front side of the camera housing H.

The length of the belt 27 equals the sum of circumferential lengths of the gears 24–26. All of these gears rotate simultaneously and in the same direction.

FIG. 6 illustrates a flash unit which is built directly into the housing 200 of a photographic camera, for example, a still camera. This flash unit can support two multiple flash bulb holders 4, 5 at a time and comprises two coupling members or sockets 37, 37', one for each of the holders. These sockets are rotatable in but cannot move axially with reference to the housing 200. The left-hand socket 37 has a cruciform recess 37a which can accommodate the plug 4a of the holder 4. The radially extending teeth 4b of the properly inserted plug 4a are releasably held by a hairpin spring 38. The recess 37a extends centrally through the entire socket 37 and its lower portion accommodates the cruciform upper end portion 39a of an ejector 39. This ejector comprises a disk-shaped portion 39d at the upper end of a spindle or stem 39b which is rotatable and can move axially in a vertical bore 40 of the housing 200. A helical ejector spring 41 bears against an internal surface 42 of the housing and urges the ejector 39 upwardly. When the spring 41 is free to expand, the cruciform end portion 39a moves deeper into the recess 37a and overcomes the retaining action of the hairpin spring 38 to separate the holder 4 from the socket 37.

The lower end portion of the stem 39b carries a radially extending tooth or claw 39c which can pass through a vertically extending slot 43 in the surface 42. When the tooth 39c registers with the slot 43, the ejector 39 can be pushed axially downwardly, for example, by exertion of finger pressure against the holder 4, whereby the spring 41 stores energy and the tooth 39c moves to a level below a second internal surface 44 at the underside of an internal holding or retaining wall 201 in the housing 200. The upper side of this holding wall 201 is constituted by the surface 42. If the ejector 39 is thereupon rotated through the intermediary of the socket 37, the tooth 39c moves away from registry with the slot 43 and the spring 41 remains in compressed condition. Thus, the wall 201 and the tooth 39c then form what might be called a bayonet lock and maintain the ejector 39 in retracted position.

The housing 200 of the camera further accommodates a driven gear 45 which is coaxial with the ejector 39 and may be rotated by a driver gear 46 forming part of the film transporting mechanism. The shaft 47 of the driven gear 45 is of square or other non-circular cross-sectional outline and its upper end portion carries a clutch disk 49 having in its top face four equidistant radially extending recesses 49a each of which can receive the tooth 39c. The disk 49 is movable axially of the shaft 47 and is biased toward the surface 44 by a helical expansion spring 48. FIG. 7 shows that the number of recesses 49a in the top face of the clutch disk 49 equals the number of flash bulbs 100 in the holder 4. The ratio of the transmission including the gears 45, 46 is such that a fresh flash bulb 100 faces the subject in response to each manipulation of the film transporting mcehanism, i.e., when the film transporting mechanism has been manipulated to place an unexposed film frame into requisite position for exposure during the next-following depression of the release trigger, the holder 4 has been rotated through 90 degrees.

The construction of the socket 37, ejector 39' and clutch disk 49' for the holder 5 are identical with the construction of the above described parts. Each component of such parts which support, index and eject the holder 5 is identified by a numeral similar to the one shown in the left-hand part of FIG. 6 or 7 but followed by a prime.

The clutch disk 49' for the holder 5 has a hub which is provided with a circumferential groove for a shifter fork 50. This fork is rotatable on a vertical shaft 51 but is held against axial movement thereon. The shaft 51 is journalled in the housing 200 of the camera, as at 52 and 53. A radially extending motion transmitting arm 54 of the shaft 51 is adjacent to the underside of the disk 39d. When the ejector 39 is moved to its retracted position, the disk 39d moves the arm 54 downwardly, as viewed in FIG. 6, and the fork 50 shifts the clutch disk 49' away from the tooth 39c' of the right-hand ejector 39'. In other words, the holder 5 then does not participate in rotation of the driver gear 46 because the driven gear 45' cannot transmit motion to the ejector 39' and socket 37'.

The upper end portion of the shaft 51 extends from the housing 200 and carries an actuating lever 51a which enables the operator to turn the shaft through 90 degrees. Such angular displacement of the shaft 51 suffices to move the motion transmitting arm 54 away from the disk 39d. The spring 48' is then free to expand and pushes the shaft 51 and the clutch disk 49' upwardly so that the latter can engage with the tooth 39'.

A two-way switch 55 is adjacent to the path of the arm 54 and changes its position when the arm 54 can move upwardly under the action of the spring 48', i.e., when the ejector 39 moves upwardly and ejects the holder 4. As shown in FIG. 8, the switch 55 then automatically connects the holder 5 into the circuit of the flash unit. A further switch 56 is closed by the arm 54 when the lever 51a is turned through 90 degrees. This switch 56 corresponds to the switch 21 of FIG. 3 so that, in addition to its other functions, the arm 54 performs the function of the selector lever 7 shown in FIG. 1. The switch 56 is connected in parallel with the switch 55 and connects one flash bulb of each of the holders 4, 5 in the circuit which includes the synchronization switch 19, source 16 and capacitor 18. As mentioned hereinbefore, the operator will decide to fire two flash bulbs at a time if the subject is located at a considerable distance from the camera or if the area which is to be illuminated is relatively large.

The operation of the flash unit shown in FIGS. 6 to 8 is as follows:

In the first step, the operator attaches two fresh multiple flash bulb holders 4, 5. In order to prevent immediate ejection by the ejectors 39 and 39', the holders 4, 5 must be pressed inwardly to overcome the resistance of the springs 41, 41', and the holder 4 is then rotated until the tooth 39c snaps into the first radial recess 49a of the clutch disk 49. Such rotation of the tooth 39c is possible because the teeth 4b of the plug 4a rotate the socket 37 and this socket in turn rotates the ejector 39 through the cruciform end portion 39a. The left-hand spring 48 expands as soon as the tooth 39c registers with one of the recesses in the disk 49 so that the holder 4 is properly coupled to the film transporting mechanism. The other holder 5 must be rotated through a small angle so that the tooth 39c' moves away from registry with the slot 43' and abuts against the surface 44'. The holder 4 is automatically prevented from further rotation by hand when the tooth 39c is properly engaged by the disk 49 because the film transporting mechanism then opposes further rotation of the ejector 39 and socket 37.

The ejector 39 is now held in retracted position so that its disk 39d maintains the motion transmitting arm 54 in the position shown in FIG. 6 and whereby the fork 50 holds the disk 49' at a level below and spaced from the tooth 39c'. If the operator wishes to make exposures with flash and to fire only one flash bulb 100 at a time, the lever 51a is left in the position of FIG. 6 so that the switch 56 remains open. When the film transporting mechanism is manipulated subsequent to the fourth exposure with flash, the tooth 39c will have completed a full revolution and returns into registry with the slot 43 so that the spring 41 is free to expand and moves the ejector 39 upwardly whereby the cruciform end portion 39a automatically expels the foot 4a from the socket 37. As the disk 39d moves upwardly, the shaft 50 is also free to move upwardly because the clutch disk 49' is biased by the spring 48'. This causes the arm 54 to change the position of the two-way switch 55 which connects the holder 5 into the flash circuit while the disk 49' engages the tooth 39c'. Prior to completed manipulation of the film transporting mechanism, the tooth 39c' snaps into one of the recesses 49a' in the top face of the disk 49' so that the right-hand socket 37' is properly coupled to the film transporting mechanism.

The operator can fire two flash bulbs at a time as long as the holder 4 contains at least one unexpended flash bulb 100. The operator knows this since, when all of the flash bulbs in the holder 4 have been fired, the holder 4 is automatically ejected by the ejector 39. In order to connect both holders into the flash circuit, the operator simply turns the lever 51a through 90 degrees to disengage the arm 54 from the disk 39d and to permit expansion of the spring 48' simultaneously with closing of the switch 56. It is to be noted that, while the fork 50 is rotatable on the shaft 50 but cannot move axially, the arm 54 is rigid with this shaft. When the film transporting mechanism is manipulated subsequent to making an exposure with two flash bulbs, the holder 5 rotates with the holder 4 because the clutch disks 49, 49' respectively engage with the teeth 39c, 39c'.

If the operator thereupon decides to again make exposures by firing a single flash bulb, the lever 51a is depressed to compress the spring 48' and is then turned so that the arm 54 again engages with the disk 39d of the ejector 39. This opens the switch 56 and disconnects the holder 5 from the film transporting mechanism. The second holder 5 is normally ejected after the eighth exposure with flash. During manipulation of the film transporting mechanism following the eighth exposure with flash, the tooth 39c' returns into registry with the slot 43' and the spring 41' is free to expand to move the ejector 39' upwardly. It will be seen that the holder 4 or 5 is ejected only when all of its flash bulbs have been fired. It is not necessary to make any adjustments if a fresh holder 4 is attached at the time when the holder 5 still contains one or more unexpended flash bulbs.

It is clear that the flash unit of FIGS. 6 to 8 can be installed in a separate casing which is then provided with a standard foot or with an analogous coupling member to facilitate its connection to the shoe of a photographic camera.

What is claimed as new and desired to be protected by Letters Patent is:

1. A flash unit, particularly for use with multiple flash bulb holders of the type having a plurality of angularly spaced equidistant flash bulbs, comprising at least two indexible coupling members each connectable with a multiple flash bulb holder to rotate the same; indexing means operative to rotate at least one of said coupling members at a time through increments corresponding to the angles between successive flash bulbs on the holders carried by said coupling members; a flash circuit for firing successive flash bulbs of one holder during intervals between successive indexing movements of the respective coupling member, said circuit comprising switch contact means movable from a first to a second position to thereby connect the other holder into said circuit; and motion transmitting means for moving said switch contact means to second position in response to that operation of said indexing means which follows the firing of the last unexpended flash bulb of the one holder.

2. A flash unit as set forth in claim 1, wherein said indexing means comprises a pair of driven gears each fixed to one of said coupling members and a driver gear arranged to rotate said driven gears, said driven gears having the same number of teeth whose sum equals the number of teeth on said driver gear.

3. A flash unit as set forth in claim 2, further comprising a symbol carrier connected with said driver gear and provided with symbols indicating that holder which is connected in said flash circuit.

4. A flash unit as set forth in claim 2, further comprising a symbol carrier connected with said driver gear and provided with numerals indicating the number of fresh flash bulbs in that holder which is connected in said flash circuit.

5. A flash unit as set forth in claim 2, further comprising housing means for said indexing means and said coupling members, said housing means having a window, and a symbol carrier connected with said driver gear and having a portion visible through said window, said symbol carrier being provided with indicia pointing at that holder which is connected in said flash circuit and with numerals indicating the number of fresh flash bulbs in such holder.

6. A flash unit as set forth in claim 2, wherein said indexing means further comprises a friction drive for rotating said driver gear.

7. A flash unit as set forth in claim 2, wherein said indexing means further comprises a drive for rotating said driver gear in response to manipulation of the film transporting mechanism in the camera on which the flash unit is being put to use.

8. A flash unit as set forth in claim 2, wherein said motion transmitting means comprises a shaft coaxially affixed to said driver gear and said switch contact means is secured to said shaft, said circuit further comprising second contact means having a plurality of separate sections adjacent to the path of movement of said switch contact means and each arranged to connect a holder into said flash circuit when engaged by said switch contact means.

9. A flash unit as set forth in claim 8, wherein said sections form a circle about said shaft.

10. A flash unit as set forth in claim 1, further comprising manually operable switch means for simultaneously connecting a plurality of holders into said flash circuit.

11. A flash unit as set forth in claim 1, wherein said indexing means comprises a rotary member coaxially secured to each of said coupling members and an endless flexible element trained around said rotary members.

12. A flash unit as set forth in claim 11, wherein said rotary members are gears and said endless flexible element is a toothed belt whose teeth mesh with the teeth of said gears.

13. A flash unit as set forth in claim 12, wherein the length of said belt equals the sum of circumferential lengths of said gears.

14. A flash unit as set forth in claim 11, further comprising a housing for said coupling members and for said indexing means, said housing having a window and said endless flexible element being provided with numerals one of which is observable through said window to indicate the number of fresh flash bulbs in the holders connected with said coupling members.

15. A flash unit as set forth in claim 11, wherein said switch contact means is adjacent to said endless flexible element and said motion transmitting means comprises a trip provided on said flexible element and arranged to displace said switch contact means when said coupling members complete a full revolution.

16. A flash unit as set forth in claim 15, wherein the number of said coupling members equals $n$ and said switch contact means comprises $n-1$ contacts spaced from each other and adjacent to the path of said trip.

17. A flash unit as set forth in claim 11, further comprising a housing accommodating said coupling members and said indexing means and having a window, said indexing means comprising a manually operable actuating member fixed to one of said coupling members and having a portion extending through said window so that said actuating member may be rotated by hand to index said coupling members.

18. A flash unit as set forth in claim 1, further comprising manually operated ejector means for simultaneously disengaging all of said coupling members from the respective holders.

19. A flash unit as set forth in claim 1, further comprising an ejector non-rotatably connected with each of said coupling members and movable axially with reference to such coupling member to assume a retracted position in response to attachment of a holder to the coupling member, resilient means opposing such axial movement of the ejectors, and means for preventing axial movement of said ejectors excepting in a single angular position of the respective ejector in which the ejector is movable to retracted position or can move in the opposite direction under the action of said resilient means to thereby separate the holder from the associated coupling member, said motion transmitting means comprising a member arranged to connect into said flash circuit a non-ejected holder in response to ejection of another holder.

20. A flash unit as set forth in claim 19, wherein said movement preventing means comprises a wall structure having a slot therein for each of said ejectors, said indexing means comprising a claw provided on each of said ejectors and being free to pass through the associated slot in said predetermined angular position of the respective ejector, said indexing means further comprising clutch disks each engageable by one of said claws in the retracted position of the respective ejector, springs for biasing said disks against the respective claws, a drive for rotating said disks, and means for holding one of said disks against engagement with the respective claw when the other claw is engaged by the respective disk.

21. A flash unit as set forth in claim 20 for use on photographic cameras of the type comprising a film transporting mechanism, wherein said drive means is constituted by such film transporting mechanism.

22. A flash unit as set forth in claim 20, wherein said holding means comprises a shaft movable axially and comprising a shifting fork coupled with one of said clutch disks to hold the same away from the associated claw when the other clutch disk engages the associated claw.

23. A flash unit as set forth in claim 22, wherein said shaft comprises an end portion provided with manually operable actuating means arranged to change the angular position of said shaft, said flash circuit further comprising switch means arranged to connect a plurality of holders into said circuit in response to such change in the angular portion of said shaft.

References Cited

UNITED STATES PATENTS

| | | | |
|---|---|---|---|
| 2,557,531 | 6/1951 | Blanchet | 240—37.1 X |
| 3,353,468 | 11/1967 | Beach | 240—37 X |
| 3,369,468 | 2/1968 | Sapp et al. | 95—11.5 |

NORTON ANSHER, *Primary Examiner.*

CHARLES E. SMITH, *Assistant Examiner.*

U.S. Cl. X.R.

240—1,3